(12) United States Patent
Workman et al.

(10) Patent No.: US 12,485,372 B2
(45) Date of Patent: Dec. 2, 2025

(54) STRUCTURE FOR APPLIANCE WATER FILTER

(71) Applicant: Haier US Appliance Solutions, Inc., Wilmington, DE (US)

(72) Inventors: Joshua K. Workman, Louisville, KY (US); Keith A. Snyder, Newburgh, IN (US); Matthew W. Okruch, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 406 days.

(21) Appl. No.: 18/093,650

(22) Filed: Jan. 5, 2023

(65) Prior Publication Data

US 2024/0226784 A1    Jul. 11, 2024

(51) Int. Cl.
*B01D 35/147* (2006.01)
*B01D 35/30* (2006.01)

(52) U.S. Cl.
CPC ......... *B01D 35/147* (2013.01); *B01D 35/306* (2013.01); *B01D 2201/302* (2013.01); *B01D 2201/4076* (2013.01); *F25D 2323/121* (2013.01)

(58) Field of Classification Search
None
See application file for complete search history.

(56) References Cited

U.S. PATENT DOCUMENTS

| | | |
|---|---|---|
| D494,654 S | 8/2004 | Macaulay et al. |
| 7,000,894 B2 | 2/2006 | Olson et al. |
| 7,147,773 B2 | 12/2006 | Mitchell et al. |
| 7,610,932 B2 | 11/2009 | Olson et al. |
| 8,097,157 B2 | 1/2012 | Tubby et al. |
| 8,627,675 B2 | 1/2014 | Kruckenberg et al. |
| 9,320,993 B2 | 4/2016 | Patera et al. |
| 9,737,834 B1 | 8/2017 | Baird |
| D820,386 S | 6/2018 | Campbell |
| 9,993,757 B2 | 6/2018 | Joung et al. |
| 10,525,387 B2 | 1/2020 | Campbell |
| 10,682,593 B2 | 6/2020 | Baird |
| 2020/0094175 A1 | 3/2020 | Campbell |

FOREIGN PATENT DOCUMENTS

| | | |
|---|---|---|
| DE | 102008064945 B3 | 5/2021 |
| KR | 20160000194 A | 1/2016 |

*Primary Examiner* — Krishnan S Menon
(74) *Attorney, Agent, or Firm* — Dority & Manning, P.A.

(57) ABSTRACT

A water filter assembly for a refrigeration appliance and an arcuate body for a water filter assembly are provided. The arcuate body includes a body forming an arcuate section. A pin extends along a longitudinal extension of the body and is configured to contact a bypass valve to close the bypass valve when the arcuate body is positioned within a chamber at the water filter assembly. The water filer assembly includes a filter body separable from the arcuate body.

18 Claims, 10 Drawing Sheets

STRUCTURE FOR APPLIANCE WATER FILTER

FIELD

The present subject matter relates generally to water filter assemblies, and more particularly to refrigeration appliances including water filter assemblies.

BACKGROUND

Water filter assemblies, such as water filter assemblies for refrigeration appliances, may include water filters for filtering water received and flowed from the refrigeration appliance. However, various water filters may be custom or specific to the refrigeration appliance or water filter assembly, which may prohibit using or mixing various water filters among various refrigeration appliances.

As such, structures allowing for various water filter assemblies to be used among various refrigeration appliances would be beneficial.

BRIEF DESCRIPTION

Aspects and advantages of the invention will be set forth in part in the following description, or may be obvious from the description, or may be learned through practice of the invention.

An aspect of the present disclosure is directed to a water filter assembly for a refrigeration appliance. The water filter assembly includes an arcuate body extending along an arcuate section. A pin extends along a longitudinal extension of the body and is configured to contact a bypass valve to close the bypass valve when the arcuate body is positioned within a chamber at the water filter assembly. The water filer assembly includes a filter body separable from the arcuate body.

Another aspect of the present disclosure is directed to an apparatus for a water filter assembly. The apparatus includes an arcuate body extending along an arcuate section. A pin extends along a longitudinal extension of the body and is configured to contact a bypass valve at the water filter assembly to close the bypass valve when the arcuate body is positioned within a chamber at the water filter assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
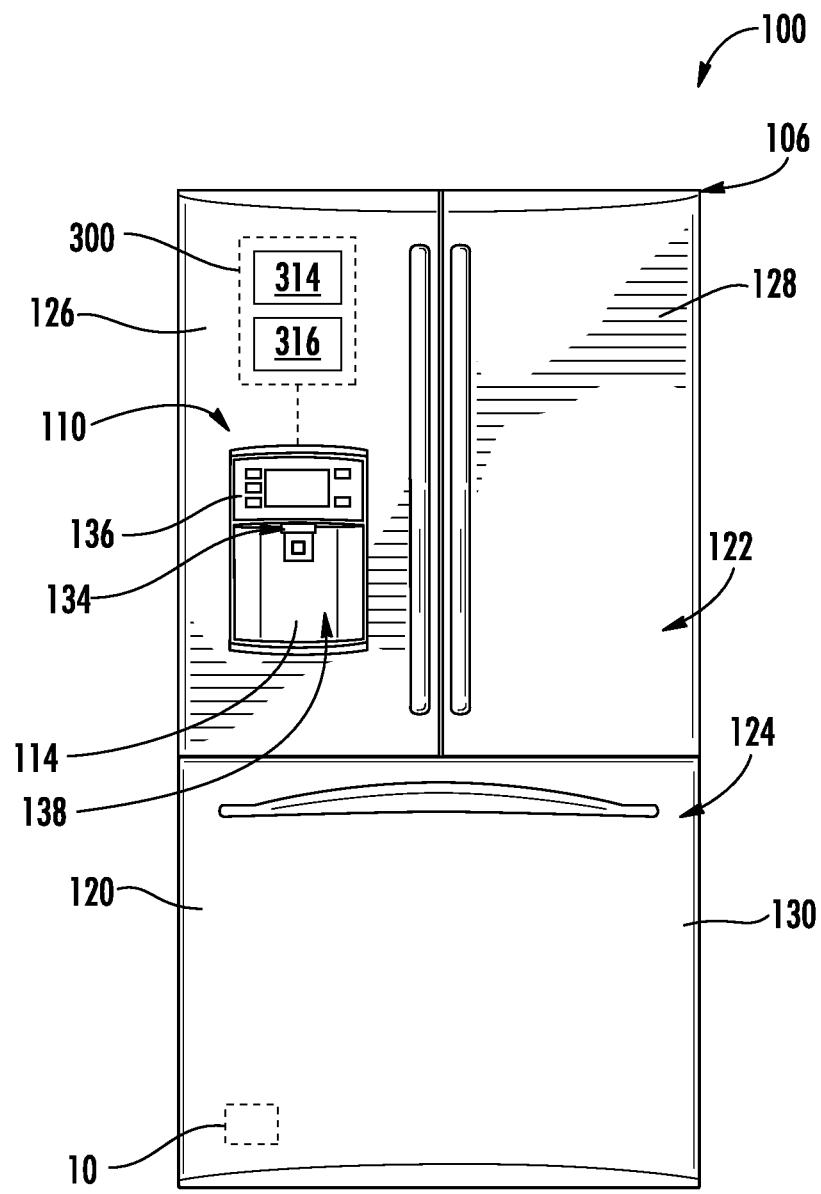
FIG. 1 provides a front, elevation view of an appliance in accordance with aspects of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin (i.e., including values within ten percent greater or less than the stated value). In this regard, for example, when used in the context of an angle or direction, such terms include within ten degrees greater or less than the stated angle or direction (e.g., "generally vertical" includes forming an angle of up to ten degrees in any direction, such as, clockwise or counterclockwise, with the vertical direction V).

Referring now to the figures, FIG. 1 depicts a front view of an example embodiment of an appliance 100. The appliance 100 may particularly form a refrigeration appliance. The appliance 100 may include a cabinet or housing 120 defining an upper refrigeration chamber 122 and a lower freezer chamber 124 arranged below the refrigeration chamber 122. As such, appliance 100 may generally be referred to as a bottom-mount refrigeration appliance. In the exemplary embodiment, housing 120 also defines a mechanical compartment (not shown) for receipt of a sealed cooling system. Using the teachings disclosed herein, one of skill in the art will understand that the present disclosure may be used with other types of refrigeration appliances (e.g., side-by-sides or top-mounts), freezer appliances, dishwashing appliances, clothes washing appliances, dryers, ovens or stoves, fluid dispensers generally, or other appropriate appliances. Accordingly, the description set forth herein is for illustrative purposes only and is not intended to limit the invention to any particular style or arrangement of appliance.

Refrigerator doors 126, 128 are rotatably hinged to an edge of housing 120 for accessing refrigeration chamber 122. A freezer door 130 is arranged below refrigerator doors 126, 128 for accessing freezer chamber 124. In the exemplary embodiment, freezer door 130 is coupled to a freezer drawer (not shown) slidably mounted within freezer chamber 124.

Appliance 100 may include a dispensing assembly 110 for dispensing liquid water and ice. Dispensing assembly 110 includes a dispenser 114 positioned on an exterior portion of appliance 100. Dispenser 114 includes a discharging outlet 134 for accessing ice and liquid water. A user interface panel 136 is provided for controlling the mode of operation of the dispenser 114, such as for providing water, ice, or a type of type (e.g., crushed, non-crushed, cubed, clear, etc.).

Discharging outlet 134 is an external part of dispenser 114, and is mounted in a dispensing recess or recessed portion 138 defined in an outside surface of refrigerator door 126. Recessed portion 138 is positioned at a predetermined elevation convenient for a user to access ice or liquid water and enabling the user to access ice or liquid water without the need to bend-over and without the need to access freezer chamber 124. In the exemplary embodiment, recessed portion 138 is positioned at a level that approximates the chest level of a user. However, in other embodiments, the dispensing assembly 110 may be positioned within the appliance 100, such as within a chilled chamber thereof.

Operation of the appliance 100 is regulated by a control device or controller 300 that is operatively coupled to user interface panel 136, one or more sensors, or both. The controller 300 may include one or more processors 314 and one or more memory devices 316. The one or more memory devices 316 may be configured to store instructions that, when executed by the one or more processors 314, causes the appliance 100 to perform operations such as provided below. The memory device(s) 316 may be configured to store data corresponding to one or more signals, functions, charts, tables, schedules, or determined values for operating a refrigeration or freezer device.

Controller 300 may include a memory device (e.g., non-transitive storage media) and microprocessor, such as a general or special purpose microprocessor operable to execute programming instructions or micro-control code associated with operating a refrigeration appliance. The memory device may represent random access memory such as DRAM, or read only memory such as ROM or FLASH. In one embodiment, the processor executes programming instructions stored in memory. The memory device may be a separate component from the processor or may be included onboard within the processor. Alternatively, controller 300 may be constructed without using a microprocessor, e.g., using a combination of discrete analog or digital logic circuitry (such as switches, amplifiers, integrators, comparators, flip-flops, AND gates, and the like) to perform control functionality instead of relying upon software. Sensors at the appliance 100 may be in communication with controller 300 via one or more signal lines or shared communication busses. User interface panel 136 may be in communication (e.g., wired or wireless communication) with controller 300 via one or more suitable shared networks.

It should be appreciated that communications busses and secondary devices may correspond to any device that may be programmed to communicate controller 300 using one of Wi-Fi, Bluetooth®, ZigBee®, or similar type of wireless communications technologies and networks while running a program that provides for user input.

Panel 136 provides selections for user manipulation of the operation of appliance 100 such as e.g., selections between whole or crushed ice, chilled liquid water, or other options. In response to user manipulation of the user interface panel 136, the controller 300 operates various components of the appliance 100. The controller 300 may be positioned in a variety of locations throughout appliance 100. In the illustrated embodiment shown in FIG. 1, the controller 300 is located within or beneath the user interface panel 136 on door 126. In such an embodiment, input/output ("I/O") signals may be routed between controller 300 and various operational components of appliance 100. In one exemplary embodiment, the user interface panel 136 may represent a general purpose I/O ("GPIO") device or functional block. In another exemplary embodiment, the user interface 136 may include input components, such as one or more of a variety of electrical, mechanical or electro-mechanical input devices including rotary dials, push buttons, and touch pads. The user interface 136 may be in communication with the controller 300 via one or more signal lines or shared communication busses, such as described further herein.

Figure 2:
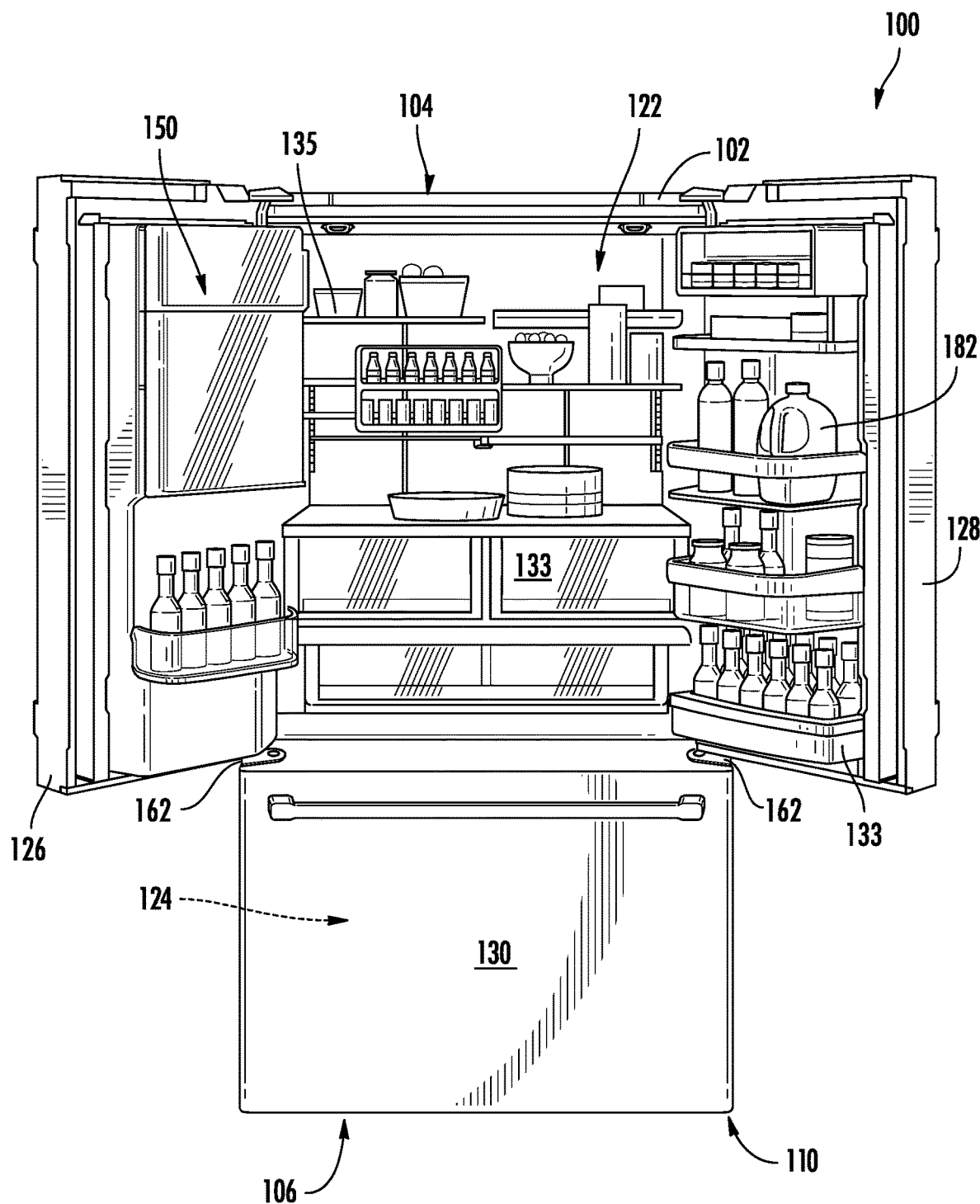
FIG. 2 provides a perspective view of an embodiment of an interior of the appliance of FIG. 1 in accordance with aspects of the present disclosure.

FIG. 2 provides a perspective view of refrigeration appliance 100 shown with refrigerator doors 126, 128 in the open position. Doors 126, 128 may include a hinge 162 configured to allow each door 126, 128 to open separately from one another. As shown in FIG. 2, various storage components are mounted within fresh food chamber 122 to facilitate storage of food items therein as will be understood by those skilled in the art. In particular, the storage components may include bins 133 and shelves 135. Each of these storage components are configured for receipt of food items (e.g., beverages and/or solid food items) and may assist with organizing such food items. As illustrated, bins 133 may be mounted on refrigerator doors 126, 128 or may slide into a receiving space in fresh food chamber 122. It should be appreciated that the illustrated storage components are used only for the purpose of explanation and that other storage components may be used and may have different sizes, shapes, and configurations.

The refrigeration appliance 100 may include a freezer appliance 150 in operable configuration with the dispensing assembly 110 (FIG. 1). The freezer appliance 150 is configured to receive fluid, such as water, into one or more ice trays to form ice.

A water filter assembly 10 in accordance with aspects of the present disclosure may be included at the appliance 100. The water filter assembly 10 may be configured to receive and filter water, such as for the dispensing assembly 110, for an icemaking system, for the freezer appliance 150, or other appropriate components and systems at the appliance 100.

Figure 3:
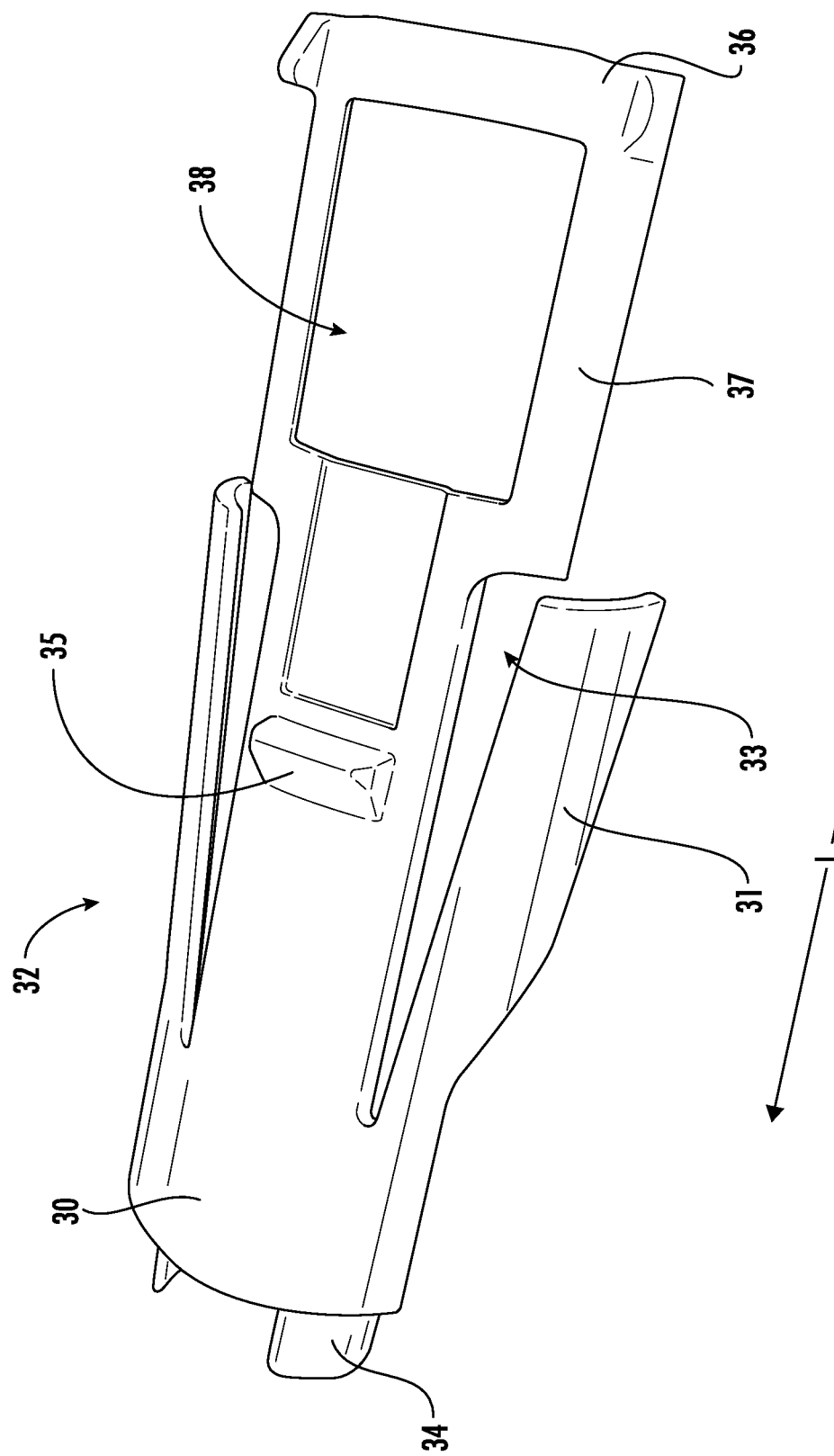
FIG. 3 provides a perspective view of an embodiment of an apparatus for a water filter assembly in accordance with aspects of the present disclosure.
Figure 4:
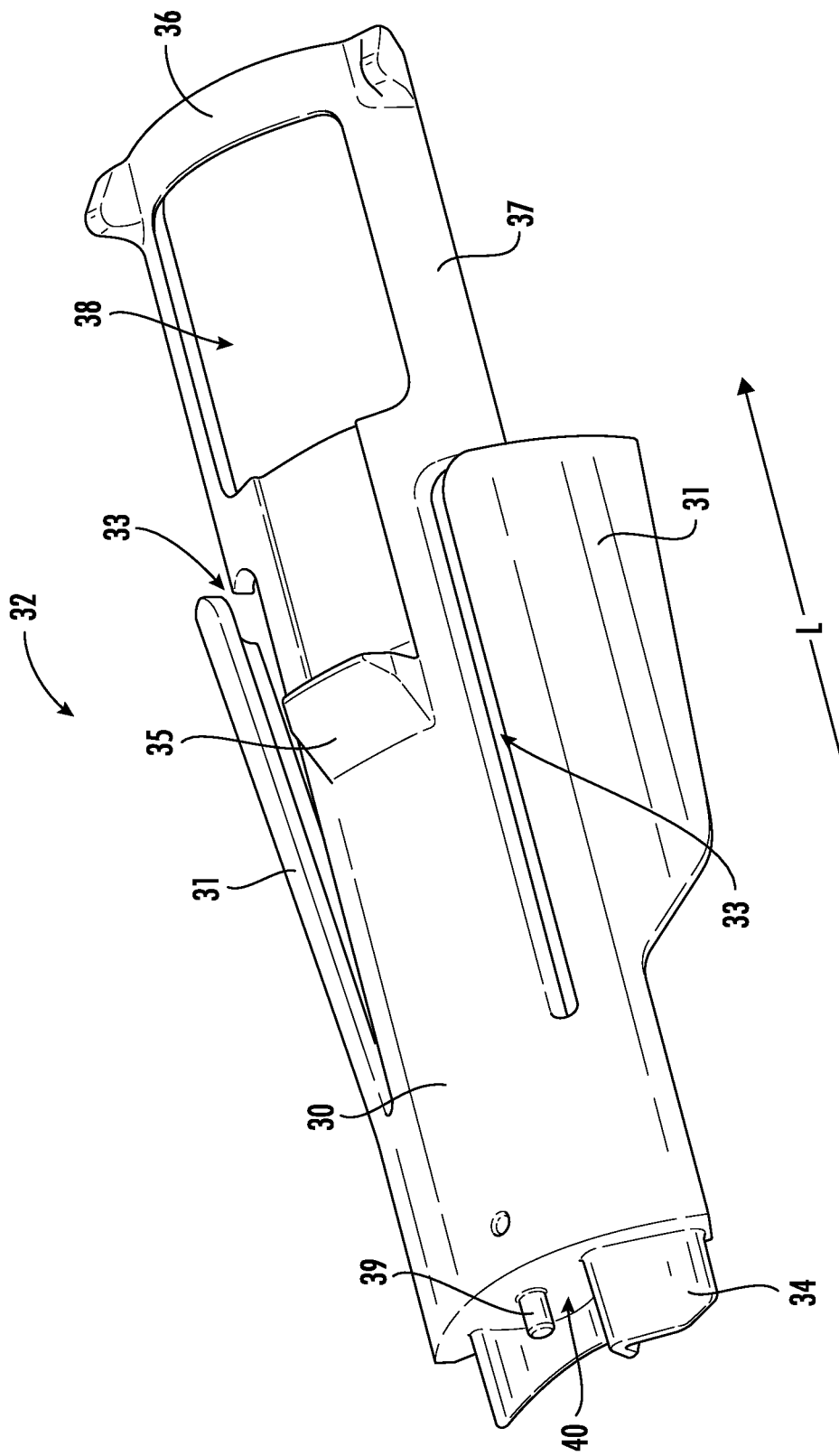
FIG. 4 provides a perspective view of an embodiment of an apparatus for a water filter assembly in accordance with aspects of the present disclosure.
Figure 5:
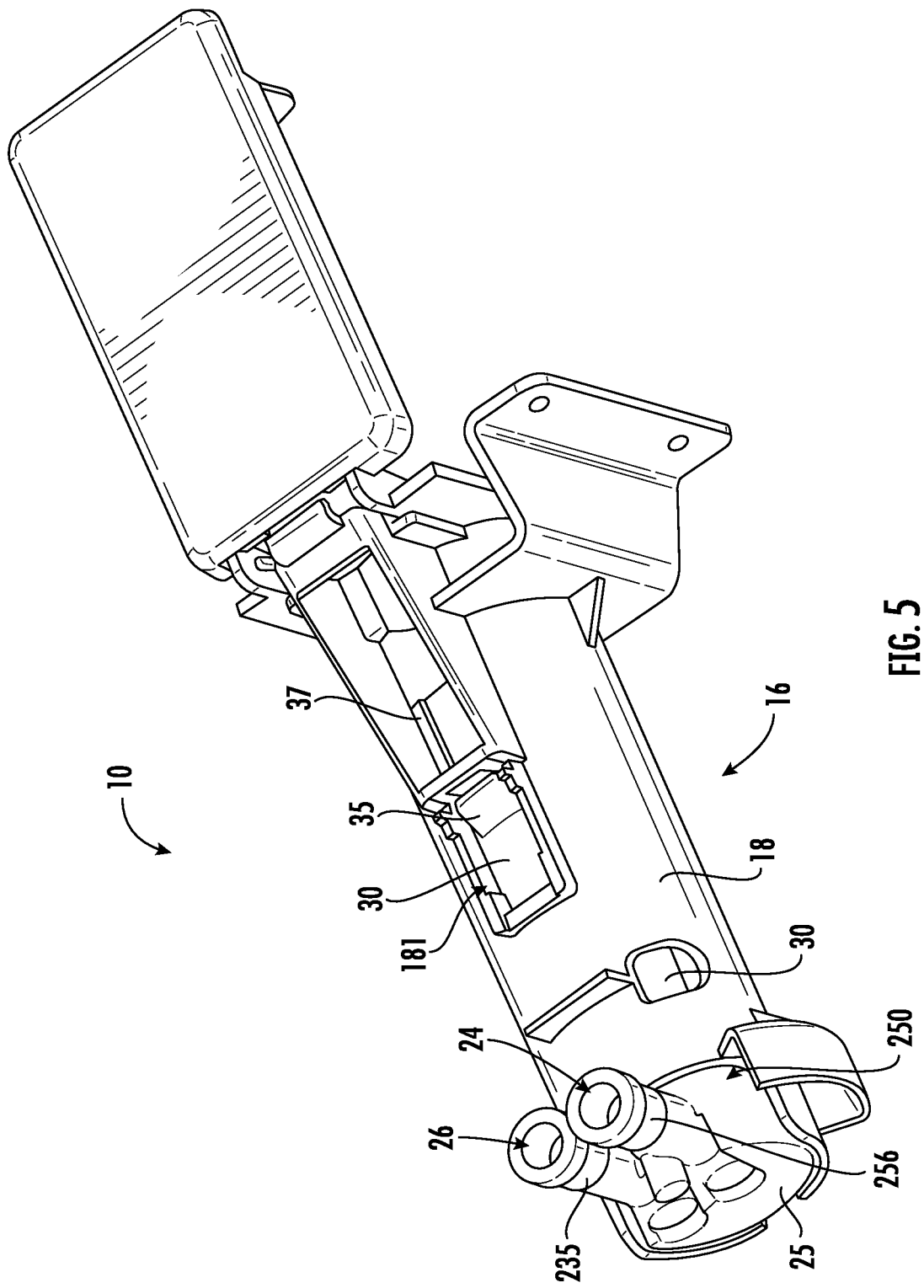
FIG. 5 provides a perspective view of an embodiment of a water filter assembly for a refrigeration appliance in accordance with aspects of the present disclosure.

Referring now to FIGS. 3-10, embodiments of the water filter assembly 10 and components therefor are provided. FIGS. 3-4 provide perspective views of embodiments of an apparatus for various embodiments of water filter assembly. The water filter assembly 10 includes an appliance interface 16. The appliance interface 16 may include a bracket or mount and housing at which a filter body 11 can be positioned. The appliance interface 16 includes an interface wall 18 forming a chamber 41 into which the filter body 11 and the apparatus 32 is positioned. The interface wall 18 may form a substantially cylindrical structure corresponding to a filter wall 14 of the filter body 11.

The apparatus 32 forms a separate and separable structure from a filter body 11. The filter body 11 forms a filter assembly, such as a water filter, configured to receive water or other fluid and filter or purify the fluid through a medium. The medium (not depicted) may include any appropriate filter media, such as, but not limited to, carbon, kinetic degradation fluxion, reverse osmosis membrane, ultraviolet light, aluminum, manganese dioxide, or active or catalytic embodiments thereof, or combinations thereof. The filter body 11 including the filter wall 14 forms a plenum 12 at which the filter medium is positioned. The filter body 11 may include a tab 13 extending radially outward from the filter wall 14. The tab 13 may form a positioning tab or stop tab at the filter body 11. For instance, referring to FIG. 9, the appliance interface 16 may include a positioning member 43 configured to position the filter body 11 along a lengthwise or longitudinal direction L.

Figure 9:
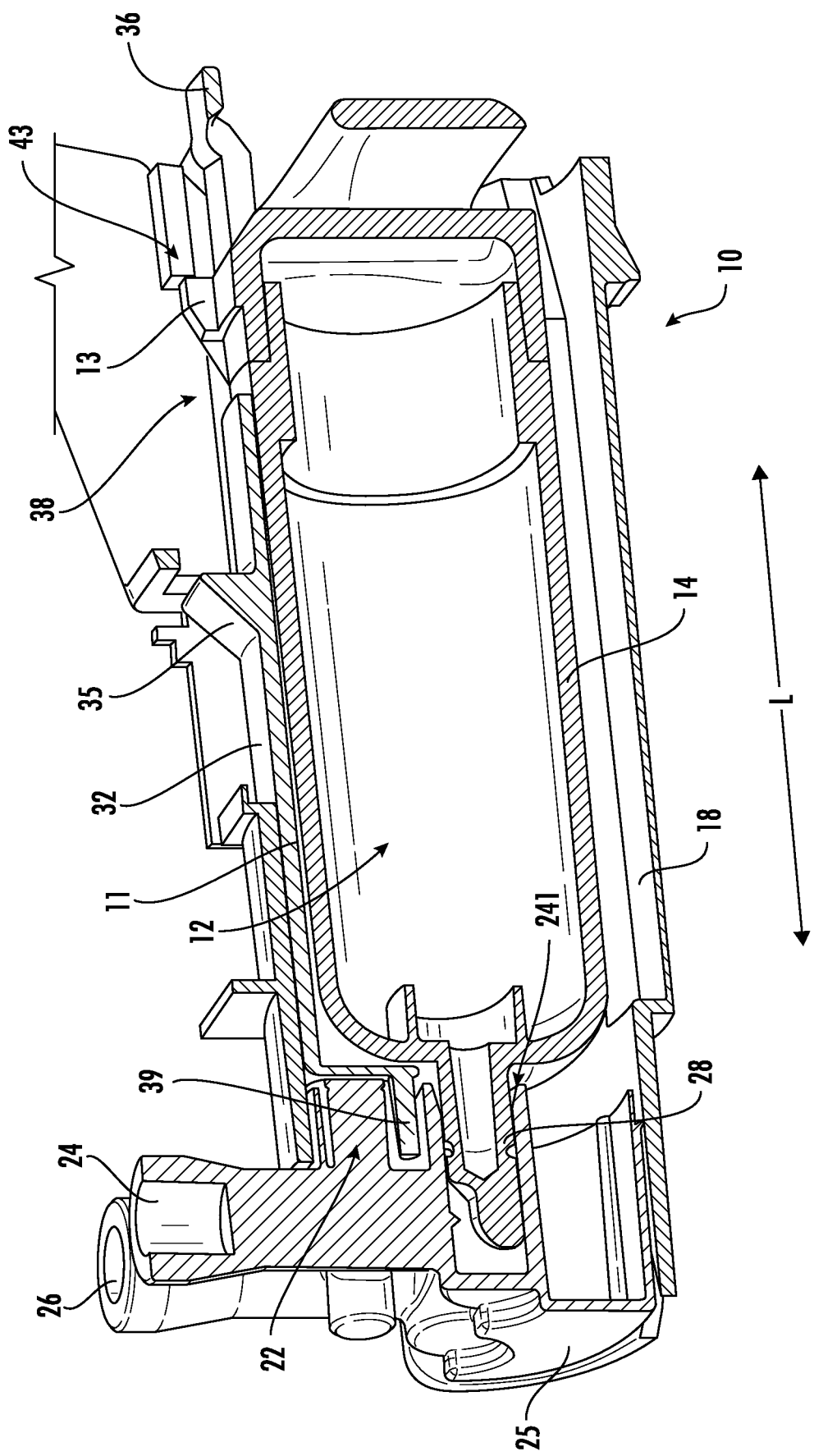
FIG. 9 provides a cutaway perspective view of an embodiment of a water filter assembly for a refrigeration appliance in accordance with aspects of the present disclosure.
Figure 10:
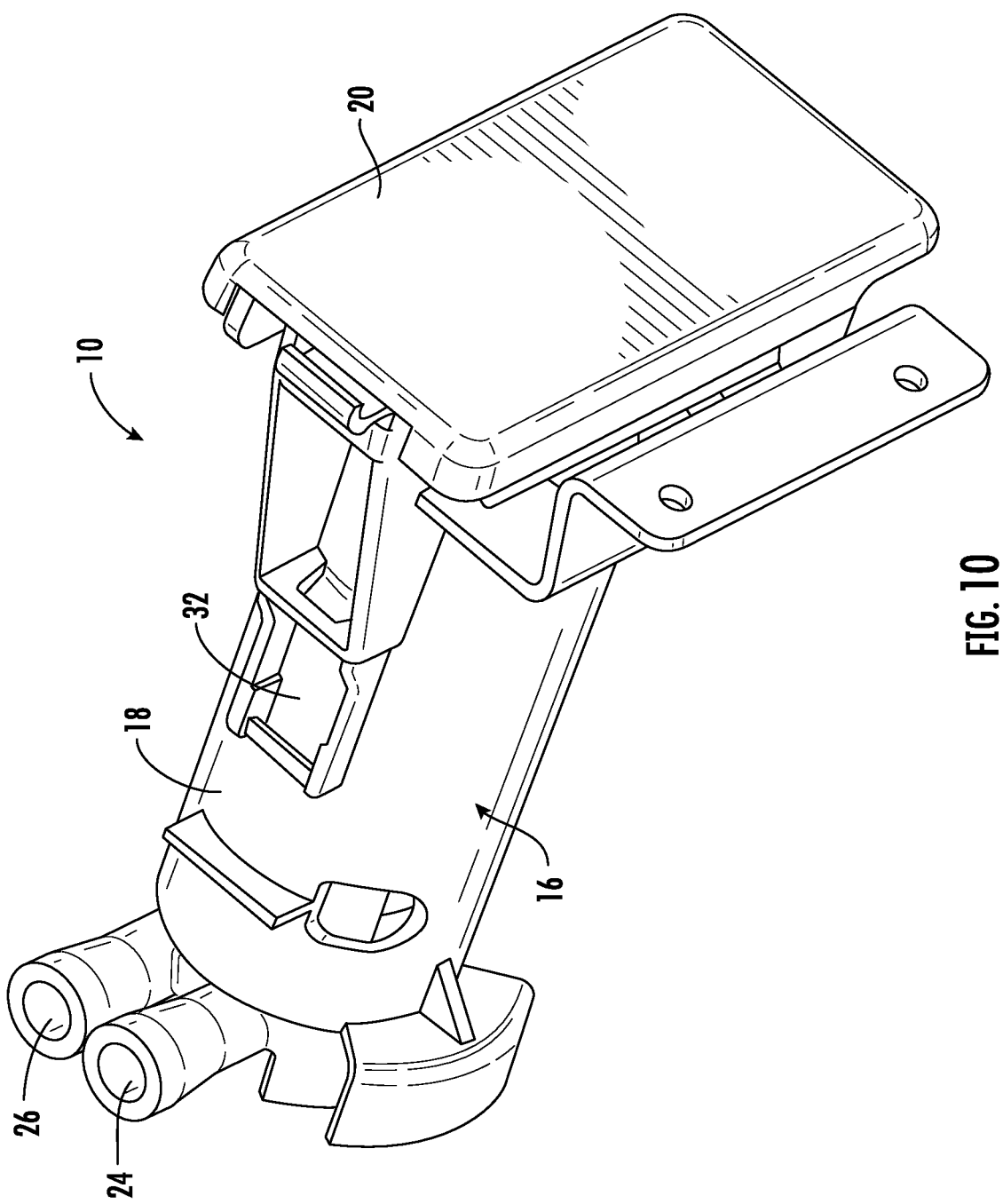
FIG. 10 provides a perspective view of an embodiment of a water filter assembly for a refrigeration appliance in accordance with aspects of the present disclosure.

Referring to FIGS. 3-4, the apparatus 32 may include a user interface member or handle 36 at which a user may grab, hold, pull, or push the arcuate body 30 into position such as described further herein. The handle 36 may be extended from an arcuate body 30 by a member 37. The member 37, such as a pair of members, may form an opening 38 through the arcuate body 30. The opening 38 extends lengthwise along the arcuate body 30 and along an arcuate section (e.g., along a circumferential arc). Referring to FIG. 9, the opening 38 allows for various embodiments of the tab 13 to extend radially through the tab 13.

Figure 6:
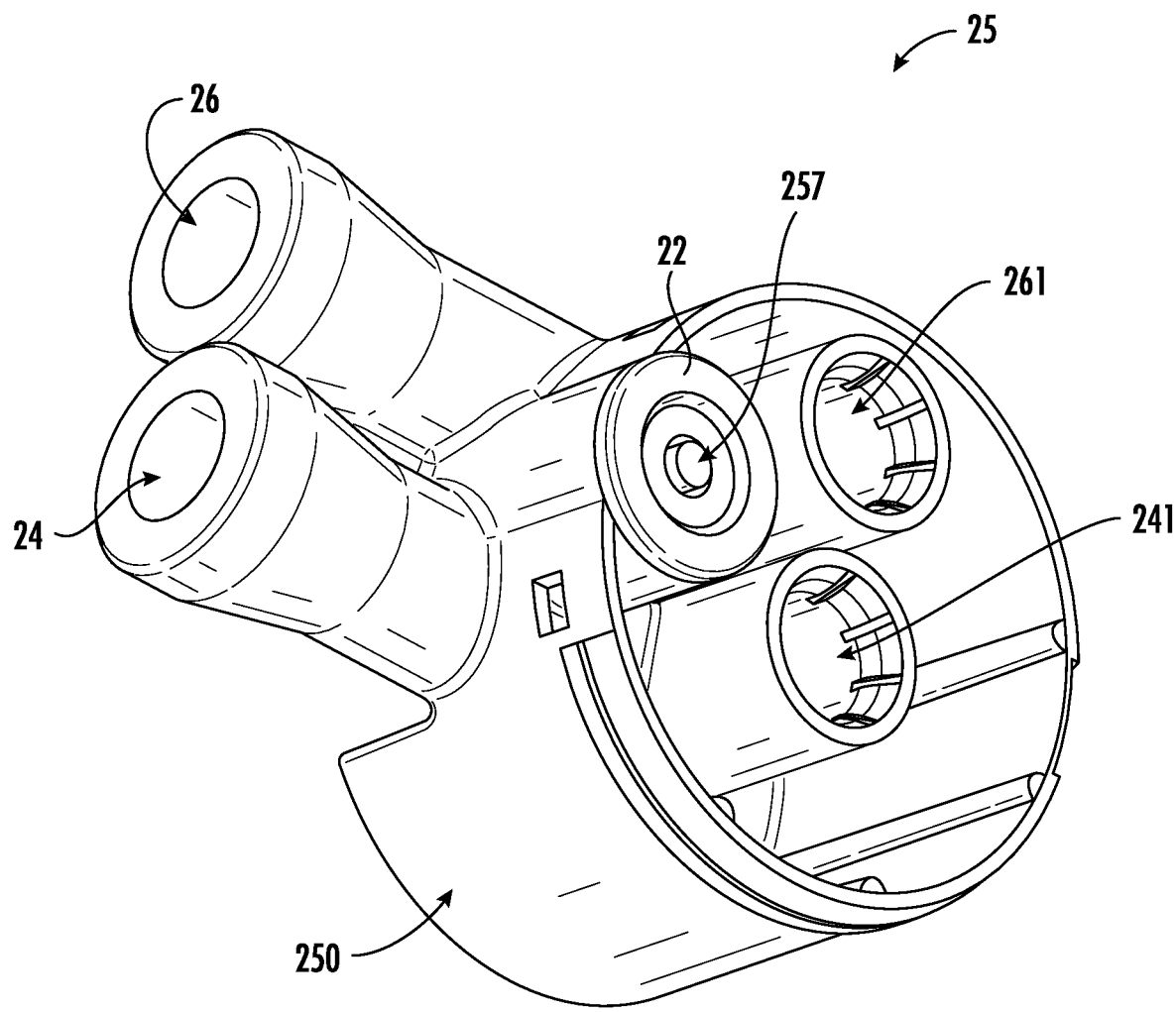
FIG. 6 provides a perspective view of an embodiment of a portion of water filter assembly for a refrigeration appliance in accordance with aspects of the present disclosure.

The apparatus 32 includes the arcuate body 30 extending along an arcuate section, such as along a circumferential arc relative to a central longitudinal axis. The apparatus 32 includes a pin 39 extending from a terminal end wall 40. The end wall 40 may extend radially inward toward the central longitudinal axis. The pin 39 may form a rod, cylinder, or other protrusion configured to extend from the end wall 40 toward a valve 22 at a cap 25 (FIG. 6). A tab 35 may extend radially outward from the arcuate body 30. The tab 35 may be configured to fit within an access opening 181 formed at the interface wall 18. A wing 31 may extend from the arcuate body 30. The wing 31 may form a slit or longitudinally extended opening 33. The wing 31 may extend longitudinally along at least a portion of the arcuate body 30, such as along a lengthwise extension of the arcuate body 30 (e.g., along longitudinal direction L). The wing 31 may form a springing structure allowing the wing 31 to extend and compress radially (e.g., inward and outward relative to the central axis). The wing 31, the tab 35, or both may form guide structures to promote orientation and placement of the apparatus 32 into the chamber 41 in a single orientation. For instance, the wing 31, the tab 35, or both may promote positioning the pin 39 toward and into the valve 22 at the cap 25. Conversely, the wing 31, the tab 35, or both may inhibit or prevent positioning the pin 39 distal to the valve 22 at the cap 25.

Referring still to FIGS. 3-4, a platform 34 may extend along the longitudinal direction L from the arcuate body 30, such as from the end wall 40. In some embodiments, the platform 34 extends co-directional to an extension of the pin 39 from the end wall 40. The platform 34 may be configured to extend partially around valve 22 at the cap 25, such as further described and depicted below. The platform 34 may form a positioning platform or tab configured to radially orient the apparatus 32 relative to the cap 25. Additionally, or alternatively, the platform 34 may be configured to circumferentially clock the apparatus 32 relative to the cap 25. The platform 34 may limit rotation of the apparatus 32, such as to mitigate shearing the pin 39 when extended into the valve 22.

Figure 7:
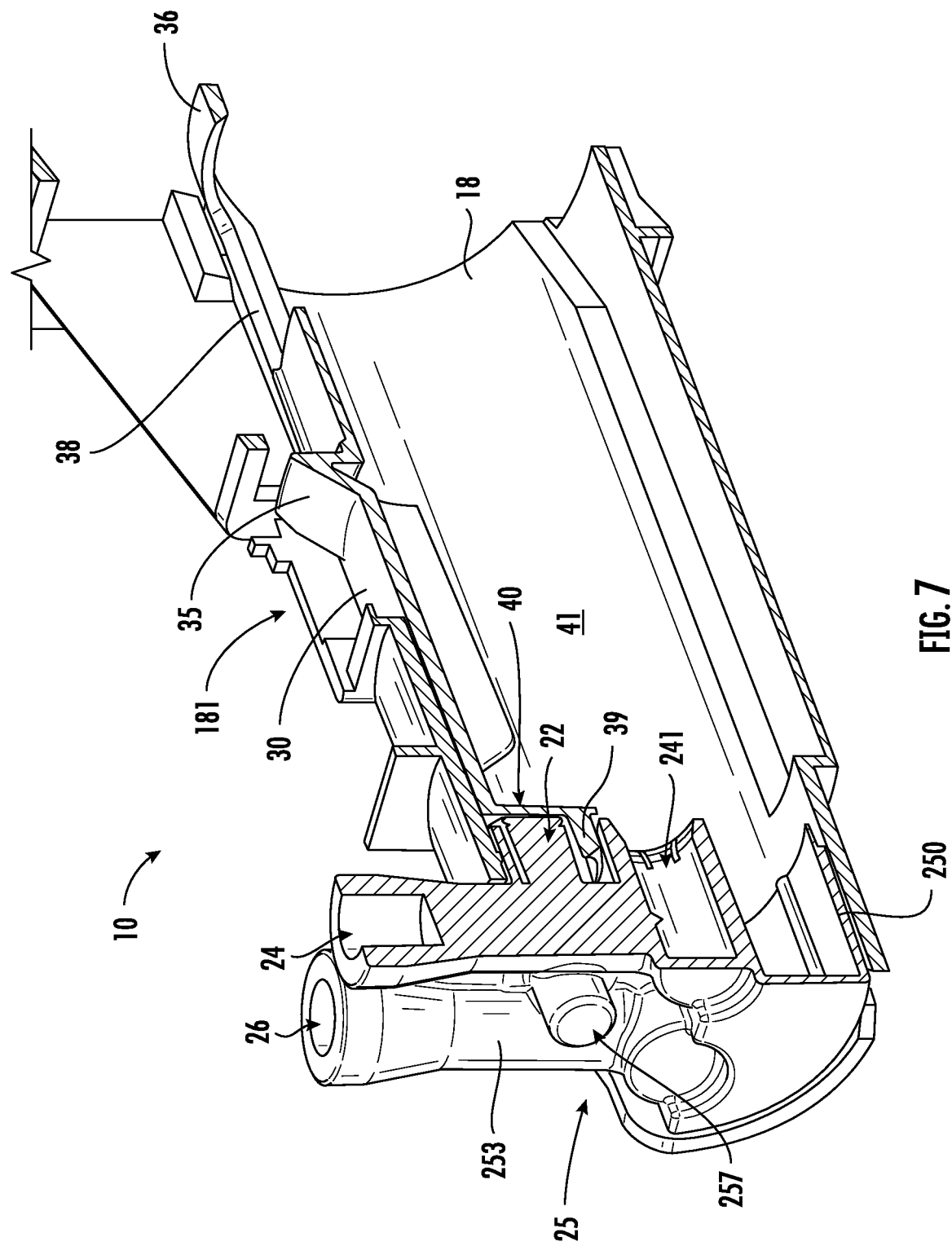
FIG. 7 provides a cutaway perspective view of an embodiment of a water filter assembly for a refrigeration appliance in accordance with aspects of the present disclosure.
Figure 8:
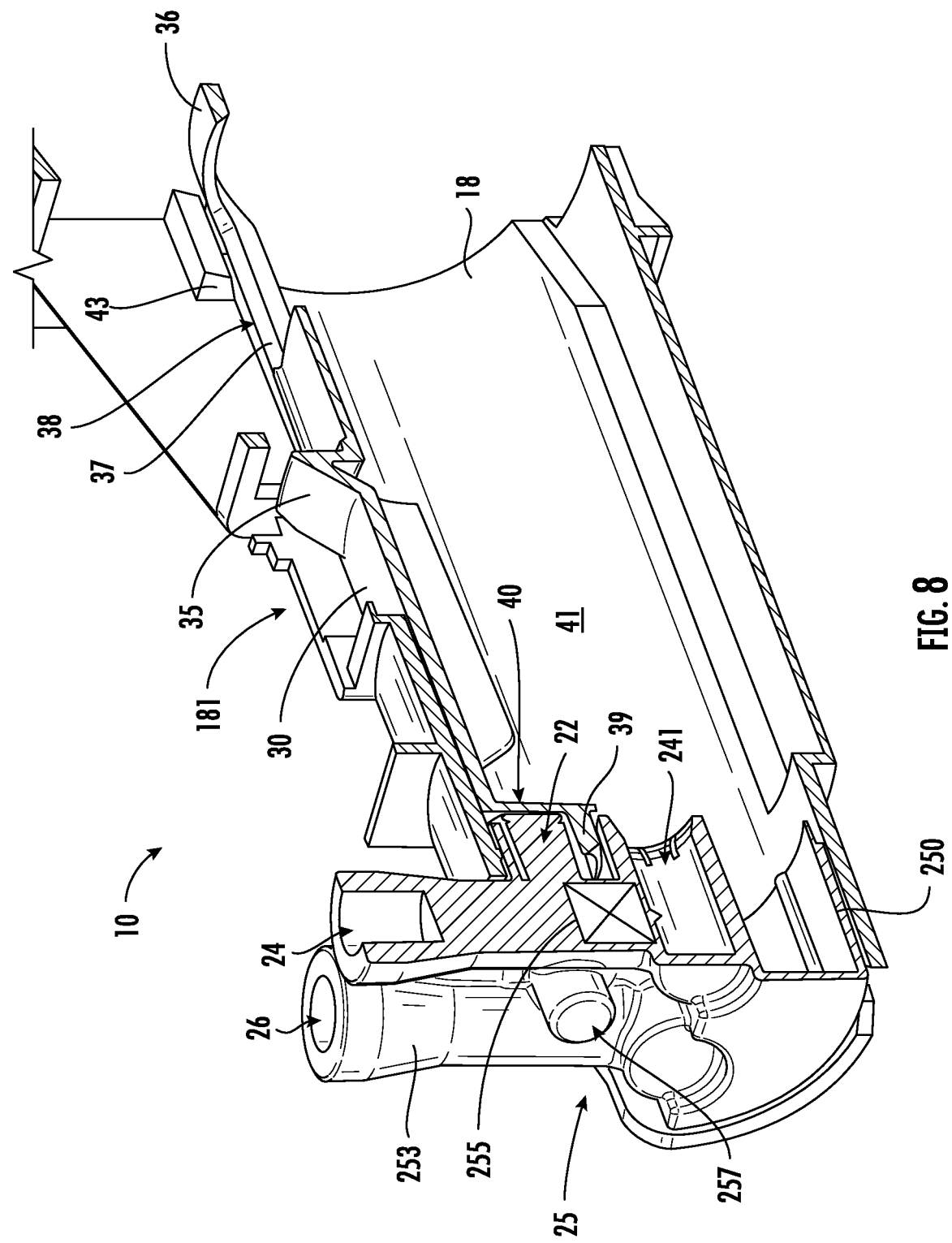
FIG. 8 provides a cutaway perspective view of an embodiment of a water filter assembly for a refrigeration appliance in accordance with aspects of the present disclosure.

Referring to FIG. 6, a perspective view of an embodiment of the cap 25 is provided. The cap 25 includes a cap body 250 forming a substantially cylindrical structure configured to position within the chamber 41 formed by the appliance interface 16. The cap 25 includes an inlet port 26 forming an inlet channel 261. The cap 25 includes an outlet port 24 forming an outlet channel 241. The inlet port 26 is configured to receive a flow of water and output the water to the filter body 11. The outlet port 24 is configured to allow a flow of water to egress from the water filter assembly 10. The cap 25 includes the valve 22, such as forming a bypass valve. The valve 22 is configured to cross-connect the inlet port 26 and the outlet port 24. In various embodiments, the valve 22 is configured to cross-connect the inlet port 26 and the outlet port 24 upstream of a closure valve 255 at the cap 25. The closure valve 255 may be included at the inlet port 26, the outlet port 24, or both. Valve 22 forming a bypass valve may allow for unfiltered water to be supplied to the appliance 100 when the filter body 11 and the apparatus 32 are removed from the water filter assembly 10. When the filter body 11 is removed and when the apparatus 32 is positioned in the water filter assembly 10 such that the pin 39 is positioned to push a corresponding valve pin 257 at the valve 22, the valve 255 at the cap 25 (e.g., at ports 24, 26) is closed. When the apparatus 32 is removed (i.e., when the pin 39 is removed from pushing from the valve pin 257), valve 22 is open. In an exemplary embodiment, such as depicted in FIGS. 7-8, insertion of the apparatus 32 into chamber 41, such as to press the pin 39 into valve pin 257, closes the valve 22.

In a further exemplary embodiment, such as depicted in FIG. 9, insertion of the filter body 11 into chamber 41 after insertion of the apparatus 32 opens valve 255 at ports 24, 26. For instance, filter body 11 may include a stem 28 configured to extend into the inlet channel 261, the outlet channel 241, or both. The stem 28 may be configured to extend into the respective channel 241, 261 when the filter body 11 is inserted (e.g., fully inserted) into chamber 41, such as to cause valve 255 to open.

In particular embodiments, embodiments of the apparatus 32 and the filter body 11 form separate components, such as to allow for separate insertion and removal of the filter body 11 and the arcuate body 30 from the chamber 41. Embodiments of the apparatus 32 and water filter assembly 10 provided herein allow for activation of water bypass independently from type or geometry of the filter body 11. The separate apparatus 32 and filter body 11 such as depicted and described herein may allow for various filter body geometries to be utilized at the water filter assembly 10.

Further aspects of the invention are provided by one or more of the following embodiments:

1. A water filter assembly for a refrigeration appliance, including an arcuate body extending along an arcuate section, wherein a pin extends along a longitudinal extension of the arcuate body, the pin configured to contact a bypass valve to close the bypass valve when the arcuate body is positioned within a chamber at the water filter assembly; and a filter body, wherein the filter body and the arcuate body are separable components.

2. The water filter assembly of any one or more clauses herein, the arcuate body including a terminal end wall, and wherein the pin extends from the terminal end wall toward the bypass valve at the water filter assembly.

3. The water filter assembly of any one or more clauses herein, the arcuate body including a wing forming a longitudinally extended opening.

4. The water filter assembly of any one or more clauses herein, wherein the wing is configured to inhibit positioning the pin distal to the bypass valve.

5. The water filter assembly of any one or more clauses herein, wherein the wing forms a spring configured to radially extend and compress.

6. The water filter assembly of any one or more clauses herein, the arcuate body including a tab configured to fit within an access opening formed at an interface wall, the interface wall forming the chamber into which the arcuate body is positionable.

7. The water filter assembly of any one or more clauses herein, the arcuate body including a platform extending from the body, the platform configured to limit rotation of the arcuate body relative to the bypass valve.

8. The water filter assembly of any one or more clauses herein, wherein the platform is configured to extend partially around the bypass valve.

9. The water filter assembly of any one or more clauses herein, including a cap including a cap body configured to position within the chamber, the cap including an inlet port forming an inlet channel and an outlet port forming an outlet channel, the cap including a bypass valve configured to cross-connect the inlet port and the outlet port.

10. The water filter assembly of any one or more clauses herein, wherein the filter body forms a plenum, the filter body configured to receive and filter water through a medium at the plenum.

11. The water filter assembly of any one or more clauses herein, wherein the arcuate body includes a member extending along a longitudinal direction, the member forming an opening extending along the longitudinal direction and along an arcuate section.

12. The water filter assembly of any one or more clauses herein, the filter body including a stem configured to open a closure valve at a cap when the filter body and the arcuate body are each inserted into the chamber, wherein the pin at the arcuate body pushes the bypass valve at the cap.

13. An apparatus for a water filter assembly, the apparatus including an arcuate body extending along an arcuate section, wherein a pin extends along a longitudinal extension of the body, the pin configured to contact a bypass valve at the water filter assembly to close the bypass valve when the arcuate body is positioned within a chamber at the water filter assembly.

14. The apparatus of any one or more clauses herein, including a platform extending from the body, wherein the platform is configured to extend partially around the bypass valve.

15. The apparatus of any one or more clauses herein, the arcuate body including a terminal end wall, and wherein the pin extends from the terminal end wall toward the bypass valve at the water filter assembly.

16. The apparatus of any one or more clauses herein, including a wing forming a longitudinally extended opening, wherein the wing is configured to inhibit positioning the pin distal to the bypass valve.

17. The apparatus of any one or more clauses herein, wherein the wing forms a spring configured to radially extend and compress.

18. The apparatus of any one or more clauses herein, the arcuate body including a tab configured to fit within an access opening formed at the water filter assembly.

19. The apparatus of any one or more clauses herein, including a platform extending from the body, the platform configured to limit rotation of the arcuate body relative to the water filter assembly.

20. The apparatus of any one or more clauses herein, including a member extending along a longitudinal direction, the member forming an opening extending along the longitudinal direction and along an arcuate section.

21. A water filter assembly including the apparatus of any one or more clauses herein.

22. A refrigeration appliance including the water filter assembly of any one or more clauses herein.

23. A refrigeration appliance including the apparatus of any one or more clauses herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A water filter assembly for a refrigeration appliance, comprising:
an arcuate body extending along an arcuate section, the arcuate body comprising a wing forming a longitudinally extended opening, wherein a pin extends along a longitudinal extension of the arcuate body, the pin configured to contact a bypass valve to close the bypass valve when the arcuate body is positioned within a chamber at the water filter assembly; and
a filter body, wherein the filter body and the arcuate body are separable components.

2. The water filter assembly of claim 1, the arcuate body comprising a terminal end wall, and wherein the pin extends from the terminal end wall toward the bypass valve at the water filter assembly.

3. The water filter assembly of claim 1, wherein the wing is configured to inhibit positioning the pin distal to the bypass valve.

4. The water filter assembly of claim 1, wherein the wing forms a spring configured to radially extend and compress.

5. The water filter assembly of claim 1, the arcuate body comprising a tab configured to fit within an access opening formed at an interface wall, the interface wall forming the chamber into which the arcuate body is positionable.

6. The water filter assembly of claim 1, the arcuate body comprising a platform extending from the arcuate body, the platform configured to limit rotation of the arcuate body relative to the bypass valve.

7. The water filter assembly of claim 6, wherein the platform is configured to extend partially around the bypass valve.

8. The water filter assembly of claim 1, comprising:
a cap comprising a cap body configured to position within the chamber, the cap comprising an inlet port forming an inlet channel and an outlet port forming an outlet channel, the cap comprising a bypass valve configured to cross-connect the inlet port and the outlet port.

9. The water filter assembly of claim 1, wherein the filter body forms a plenum, the filter body configured to receive and filter water through a medium at the plenum.

10. The water filter assembly of claim 1, wherein the arcuate body comprises a member extending along a longitudinal direction, the member forming an opening extending along the longitudinal direction and along an arcuate section.

11. The water filter assembly of claim 1, the filter body comprising a stem configured to open a closure valve at a cap when the filter body and the arcuate body are each inserted into the chamber, wherein the pin at the arcuate body pushes the bypass valve at the cap.

12. An apparatus for a water filter assembly, the apparatus comprising:
an arcuate body extending along an arcuate section, the arcuate body comprising a pin extending along a longitudinal extension of the arcuate body, the pin configured to contact a bypass valve at the water filter assembly to close the bypass valve when the arcuate body is positioned within a chamber at the water filter assembly; and
a wing forming a longitudinally extended opening, wherein the wing is configured to inhibit positioning the pin distal to the bypass valve.

13. The apparatus of claim 12, the arcuate body comprising a terminal end wall, and wherein the pin extends from the terminal end wall toward the bypass valve at the water filter assembly.

14. The apparatus of claim 12, wherein the wing forms a spring configured to radially extend and compress.

15. The apparatus of claim 12, the arcuate body comprising a tab configured to fit within an access opening formed at the water filter assembly.

16. The apparatus of claim 12, comprising:
a platform extending from the body, the platform configured to limit rotation of the arcuate body relative to the water filter assembly.

17. The apparatus of claim 16, wherein the platform is configured to extend partially around the bypass valve.

18. The apparatus of claim 12, comprising:
a member extending along a longitudinal direction, the member forming an opening extending along the longitudinal direction and along an arcuate section.

\* \* \* \* \*